ated Nov. 8, 1960

2,959,592

PROCESS OF PRODUCING β-YOHIMBINE

Maurice-Marie Janot, Robert Goutarel, and Alain Le Hir, Paris, France, assignors to Les Laboratoires Gobey, Paris, France, a corporation of France No Drawing. Filed Feb. 19, 1959, Ser. No. 794,228

Claims priority, application France Feb. 26, 1958

4 Claims. (Cl. 260—287)

The present invention relates to a process of preparing β-yohimbine from yohimbinone.

In copending patent application Serial No. 794,226 filed February 19, 1959 and entitled Yohimbinone and a Process of Making Same, there is described a simple process of preparing yohimbinone by oxidation of yohimbine.

It is one object of the present invention to provide a simple and effective process of converting said yohimbinone into β-yohimbine, a compound of valuable properties.

Other objects of the present invention and advantageous features thereof will become apparent as the description proceeds.

The process according to the present invention has for its purpose and makes possible the conversion of yohimbinone into β-yohimbine by a selective hydrogenation causing orientation of the $C_{17}$-hydroxyl group to the β-position, according to the following equation:

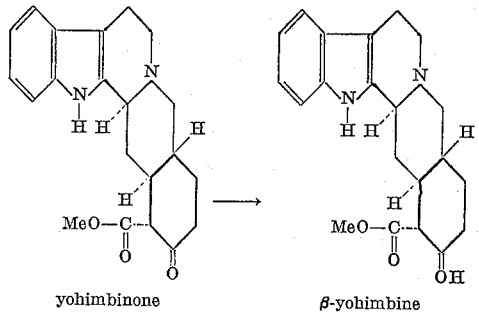

yohimbinone      β-yohimbine

It is an advantage of the present invention that β-yohimbine is produced very easily with satisfactory yields.

In principle, the process according to the present invention consists in reducing yohimbinone by means of an alkali metal boronhydride or, respectively, by catalytic hydrogenation in the presence of hydrogenation catalysts, such as, for instance, platinum oxide, palladium black, and the like. The less soluble β-yohimbine is easily isolated from the crude reduction product by fractional crystallization at room temperature. The reaction is preferably carried out in a water-soluble solvent, such as methanol. The desired reduction product is obtained in substantially pure form by simple recrystallization. β-Yohimbine has interesting pharmacodynamic properties and is useful as intermediate in the preparation of valuable yohimbane derivatives.

The following examples serve to illustrate the present invention, without, however, limiting the same thereto. More particularly, the order of introducing the reactants may be changed, the nature of the solvents may be varied by using, for instance, tetrahydrofuran as solvent, other alkali metal boronhydrides may be employed than potassium boronhydride, and other hydrogenation catalysts than those mentioned may be used in accordance with the principles set forth herein and in the claims annexed thereto. The melting points given in the examples are instantaneous melting points determined on the Maquenne block.

*Example 1*

Reduction of yohimbinone to β-yohimbine by means of potassium boronhydride.

5.00 g. of potassium boronhydride are added to 4 g. of yohimbinone in 200 cc. of methanol. The reaction mixture is stirred for 4 hours at room temperature. After the addition of one l. of water, the mixture is extracted with ether. The extracts are then dried over sodium sulfate and distilled to dryness. The residue is recrystallized from methanol. 1.450 g. (36%) of β-yohimbine of the melting point=235° C. (with decomposition) and the optical rotation $[\alpha]_D^{20} = -48° = \pm 2°$ (concentration: 1% in pyridine) are obtained. The compound is identical with the compound described in the literature.

Working up of the mother liquors permits isolation of a supplementary quantity of the desired compound.

*Example 2*

Catalytic hydrogenation of yohimbinone to β-yohimbine.

0.5 g. of platinum oxide, prepared according to Adams, are added to 1.5 g. of yohimbinone in 500 cc. of alcohol at 96%. Hydrogenation takes place with agitation at room temperature. The alcoholic solution is then filtered. β-Yohimbine is separated and purified as described above. 480 mg. of β-yohimbine are obtained. The yield is 32% of the theoretical yield.

In place of potassium boronhydride, used in Example 1, there may be employed another alkali metal boronhydride, such as sodium boronhydride or lithium boronhydride.

In place of methanol used as solvent in the reduction process by means of an alkali metal boronhydride, there may be employed other water-soluble solvents, such as ethanol, dioxane, tetrahydrofuran, and others.

We claim:

1. In a process of producing β-yohimbine, the steps which comprise catalytically hydrogenating yohimbinone in ethanol in the presence of platinum oxide and isolating β-yohimbine from the hydrogenation product.

2. In a process of producing β-yohimbine, the steps which comprise adding an alkali metal boronhydride to yohimbinone in a solvent selected from the group consisting of water-soluble lower alkanols, dioxane, and tetrahydrofuran, stirring the reaction mixture at room temperature until reduction is completed, and isolating the resulting β-yohimbine from the reduction mixture.

3. In a process of producing β-yohimbine, the steps which comprise adding an alkali metal boronhydride to yohimbinone in methanol, stirring the reaction mixture at room temperature until reduction is completed, and isolating the resulting β-yohimbine from the reduction mixture.

4. In a process of producing β-yohimbine, the steps which comprise adding potassium boronhydride to yohimbinone in methanol, stirring the reaction mixture at room temperature until reduction is completed, and isolating the resulting β-yohimbine from the reduction mixture.

References Cited in the file of this patent

Bader: J. Am. Chem. Soc., vol. 77, pp. 3547–3550 (1955).

Le Hir: Compt. Rend., vol. 246 (1958), pp. 1564–6.